(12) United States Patent
Knight (10) Patent No.: US 7,255,508 B1
(45) Date of Patent: Aug. 14, 2007

(54) WRITING SYSTEM AND INK PEN HAVING TIME-DEPENDENT CHARACTERISTICS

(76) Inventor: Andrew F. Knight, 2770 Airline Goldmine Rd., Canon, GA (US) 30520

( * ) Notice: Subject to any disclaimer, the term of this patent is extended or adjusted under 35 U.S.C. 154(b) by 0 days.

(21) Appl. No.: 11/164,837

(22) Filed: Dec. 7, 2005

Related U.S. Application Data (62) Division of application No. 10/697,255, filed on Oct. 31, 2003, now Pat. No. 7,001,091.

(51) Int. Cl.
*B43K 29/00* (2006.01)
*B43K 27/04* (2006.01)
*A46B 11/00* (2006.01)
*G01B 21/08* (2006.01)
*G01D 21/00* (2006.01)

(52) U.S. Cl. .................. 401/195; 401/198; 401/35; 401/47; 73/150 R; 116/206

(58) Field of Classification Search ........... 401/195, 401/198, 35, 47; 73/150 R; 116/206–207
See application file for complete search history.

(56) References Cited

U.S. PATENT DOCUMENTS

| | | | | |
|---|---|---|---|---|
| 3,979,550 | A | * | 9/1976 | Panken ................. 503/203 |
| 4,139,965 | A | * | 2/1979 | Curry et al. ............ 434/84 |
| 5,215,956 | A | * | 6/1993 | Kawashima ........... 503/201 |
| 5,600,443 | A | * | 2/1997 | Frey et al. ............. 356/402 |

* cited by examiner

*Primary Examiner*—David J. Walczak (57) ABSTRACT

A writing system for producing a writing having time-dependent characteristics includes: a pen including: a reservoir containing a fluid; and a writing tip configured to dispense the fluid to a writing surface, wherein the fluid includes a first chemical; and a writing surface including a second chemical chemically reactive with the first chemical, wherein the chemical reaction between the first and second chemicals has a known time dependence, and wherein an extent of chemical reaction between the first chemical and the second chemical is indicative of a time of dispensing of the fluid to the writing surface.

17 Claims, 3 Drawing Sheets

WRITING SYSTEM AND INK PEN HAVING TIME-DEPENDENT CHARACTERISTICS

REFERENCE TO RELATED APPLICATION

This application is a Divisional of U.S. patent application Ser. No. 10/697,255, filed Oct. 31, 2003, issued as U.S. Pat. No. 7,001,091, on Feb. 21, 2006, entitled, "Ink Pen for Dispensing Ink Having Time-Dependent Characteristics," the disclosure of which is hereby incorporated by reference.

BACKGROUND

There are many situations in which there is a need to determine the time and/or date of a writing. Possibly the most obvious example to anyone reading this document is the need to prove the date of a writing to show conception of an invention on or before the effective date of a prior art document or event. For example, in the U.S. first-to-invent system, a first inventor of an invention who files a U.S. patent application after a second inventor files a U.S. patent application on the same subject matter may be able to "win" the patent rights in a priority contest if the first inventor can show prior conception and diligence from before the second inventor's conception to the first inventor's U.S. filing date. One way to show prior conception is, e.g., to provide detailed laboratory notes that disclose the invention. Typically, to convince a jury, the notes must be dated and witnessed.

A problem with this method is multifaceted. First, an independent inventor may be unfamiliar with U.S. law and may have insufficient corroborating evidence to prove the asserted date of conception. Second, if the witness is biased (such as if the witness works for the same company as the inventor), her testimony may be insufficient to corroborate the written lab notes. Third, if the witness is not one of skill in the art, the witness may not be able to convince a jury that she knew the inventor possessed the invention on the asserted conception date. If, in addition to any witness testimony, the inventor can physically prove a date that the ink was placed on the lab note paper, this additional evidence may be sufficient to convince a jury of the asserted conception date. Thus, there has been a need to determine the age of ink. Of course, this need exists in other fields besides inventorship, conception, and patents. For example, a person may want to prove that he signed a legal document on a particular date, or may want to prove that he wrote certain entries in a legal document on different dates. Such a need often arises in expensive litigation, such as insurance litigation. A claimant, who may have been accused of insurance fraud by making several dated entries (dated on different days) on the same day. The claimant may be able to counter this accusation by determining the age of the ink on each of the entries. One skilled in the art will recognize that there is a wide host of situations in which one needs to determine the age of ink deposited on a writing surface (such as paper).

Presently, ink dating analysis is based on the observation that typical ball-point ink does not fully dry for up to five years. Because wet ink and dry ink dissolve in a solvent at different rates, the approximate age of ink on a writing surface may be determined by dissolving a known quantity of the drying ink in a solvent and timing the rate of dissolution; the faster the dissolution, the more recently the ink was applied to the writing surface. There are a host of problems with this method. First, because currently available inks vary widely in their properties, such as chemical content, viscosity, and vapor pressure, the age of the ink determined by this method is very approximate, and cannot yield the kind of accurate dating required in some litigation. Second, the method is easy to fool. A defrauder may attempt to make a written ink appear much older than it actually is simply by heating or cooking the document. Applying heat to ink increases its vapor pressure and the rate at which it dries. Alternatively or in addition, the defrauder may place the document in a vacuum chamber, where the ink will naturally dry more quickly than in the atmosphere.

One attempt to solve the first problem above (the inherent uncertainties in current ink aging analyses) is disclosed in U.S. Pat. Nos. 5,600,443 and 5,759,246 to Frey et al. Frey discloses a method and ink composition of two possible mechanisms. The first mechanism relates to detecting color shifts of pH sensitive compounds in the ink as the result of the evaporation of certain acidic or basic compounds thereof. The second mechanism relates to the oxidation of compounds in the ink by reaction with oxygen in the air. Frey does not solve the second problem posed above (the ease of defrauding). For example, in the first mechanism, the evaporation of the certain acidic or basic compounds in the ink can be artificially accelerated by a defrauder by either heating the inked document or placing the inked document in a vacuum chamber. In the second mechanism, the oxidation of the compounds can be artificially accelerated by a defrauder by either heating the inked document or placing the inked document in a pressure chamber in which the oxygen density is higher than in the atmosphere. For example, because the sea-level atmosphere has a pressure of about 1 atm and contains about 20% oxygen, the oxidation of the compounds may be artificially accelerated by placing the inked document in a pressure chamber such that the pressure chamber contains a pressure higher than atmospheric, a oxygen content of greater than 20%, or both. Thus, it is relatively easy to make the ink of Frey appear that it was placed on the document in question on a date much earlier than it actually was.

SUMMARY OF THE INVENTION

The present invention aims to solve one or more of these and other problems.

In a preferred embodiment of the present invention, a pen may comprise: a housing; a first reservoir inside the housing and configured to contain a first fluid, the first reservoir comprising a first opening configured to dispense the first fluid; a second reservoir inside the housing and configured to contain a second fluid, the second reservoir comprising a second opening configured to dispense the second fluid; a first writing tip extending from the housing and configured to dispense a substantially homogeneously mixed fluid to a writing surface; and a mixing region connected to the first and second openings and the first writing tip and configured to substantially homogeneously mix the first and second fluids and dispense the substantially homogeneously mixed fluid to the first writing tip. A maximum length of the pen may not be greater than approximately ten inches. The pen may further comprise a second writing tip extendable from the housing and configured to receive only the first fluid and to dispense the first fluid unmixed with the second fluid to the writing surface.

In a preferred aspect, the mixing region may have a length substantially parallel to and a width substantially perpendicular to an average flow direction of the first and second fluids through the mixing region, wherein the length is at least twice the width. The mixing region may comprise a porous material, such as felt. The mixing region and first writing tip may be configured to be removable from the pen and readily replaceable.

In another preferred aspect, the first opening may be substantially greater than the second opening. Further, the substantially homogeneously mixed fluid may comprise substantially more of the first fluid than the second fluid. Further, the first fluid may be substantially more viscous than the second fluid.

In another preferred aspect, the first fluid may comprise a first chemical, such as a resin, and the second fluid may comprise a second chemical, such as a hardener, that is chemically reactive with the first chemical. Further, the first and second chemicals may solidify into a solid product upon chemically reacting. The chemical reaction between the first and second chemicals may have a known time dependence, an extent of chemical reaction between the first and second chemicals may be indicative of a time of mixing of the first and second fluids. Further, at least one of the first and second chemicals may be dissolvable in a solvent, and the solid product may be substantially insoluble in the solvent, and an extent of dissolution of the at least one of the first and second chemicals in a fixed time may be indicative of a time of mixing of the first and second fluids. Further, the solid product may decompose at a known rate, and an extent of decomposition of the solid product may be indicative of a time of dispensing of the substantially homogeneously mixed fluid to the writing surface.

In another preferred aspect, the first fluid may further comprise a first dye, and the second fluid may further comprise a second dye, wherein a color of the substantially homogeneously mixed fluid is indicative of a concentration of the first fluid in the substantially homogeneously mixed fluid.

In another preferred aspect, the first and second chemicals may solidify into a solid product at a rate such that a viscosity of the substantially homogeneously mixed fluid at 25 degrees Celsius is greater than 10,000 centipoise at any time after seven days after a time of dispensing of the substantially homogeneously mixed fluid to the writing surface, and the viscosity is less than 10,000 centipoise at any time before one day after the time of dispensing of the substantially homogeneously mixed fluid to the writing surface.

In another preferred aspect, the first fluid may comprise a third chemical chemically reactive with a paper writing surface, and an extent of chemical reaction between the third chemical and the paper writing surface may be indicative of a time of mixing of the first and second fluids.

In another preferred aspect, the substantially homogeneously mixed fluid may comprise a heat-activated indicator. The heat activated indicator may comprise at least two reactants which at normal room temperature do not react with each other, but which, upon application of thermal energy, undergo a chemical reaction with each other which results in change of color.

In another preferred aspect, the first fluid may further comprise a third chemical and the second fluid may comprise a fourth chemical chemically reactive with the third chemical, and the chemical reaction between the third and fourth chemicals has a known time dependence, and an extent of chemical reaction between the third and fourth chemicals may be indicative of a time of mixing of the first and second fluids. At least one of the third and fourth chemicals may have a color, and the color changes during chemical reaction between the third and fourth chemicals, and a color of the substantially homogeneously mixed fluid is indicative of a time of mixing of the first and second fluids.

In another preferred aspect, the first fluid may further comprise a first chemical identifier, such as at least a first rare-earth element, such that a relative concentration of the first rare-earth element in the fluid ink is indicative of a manufacturer of the fluid ink. The second fluid may further comprise a second chemical identifier comprising at least a second rare-earth element, and a relative concentration of the first and second rare-earth elements in the substantially homogeneously mixed fluid may be indicative of a concentration of the first fluid in the substantially homogeneously mixed fluid.

In another preferred embodiment of the present invention, an ink pen for dispensing ink having time-dependent characteristics may comprise: a writing pen, comprising at least one reservoir configured to contain a fluid, and further comprising a writing tip configured to dispense the fluid to a writing surface; and a fluid ink having time-dependent characteristics contained in the at least one reservoir, the ink comprising: a first chemical, such as a resin; a second chemical, such as a hardener; and a dye, wherein the first and second chemicals are chemically reactive and solidify into a solid product upon chemically reacting, wherein the writing pen and fluid ink are configured so that: at least the first and second chemicals are substantially chemically isolated from each other prior to dispensing the ink to the writing surface; and at least the first and second chemicals are substantially mixed with each other upon dispensing the fluid ink to the writing surface so as to chemically react with each other. A maximum length of the pen may not be greater than approximately ten inches.

In a preferred aspect, the fluid ink may further comprise a third chemical chemically reactive with a paper writing surface, wherein an extent of chemical reaction between the third chemical and the paper writing surface is indicative of a time of dispensing of the fluid ink.

In another preferred aspect, the fluid ink may be contained in exactly one reservoir, and at least one of the first and second chemicals may be encapsulated in microcapsules. The microcapsules may have a diameter of not more than approximately 20 micrometers, the microcapsules each having an outer wall that is substantially nonreactive with the first and second chemicals at normal room temperature. Further, the writing tip may comprise a ball point configured to crush the microcapsules, and to release the one of the first and second chemicals into the other of the first and second chemicals, upon dispensing the fluid ink to the writing surface.

In another preferred aspect, the chemical reaction between the first and second chemicals may have a known time dependence, and an extent of chemical reaction between the first and second chemicals may be indicative of a time of dispensing of the fluid ink to the writing surface. Further, at least one of the first and second chemicals may be soluble in a solvent and the solid product may be substantially insoluble in the solvent, and an extent of dissolution of the at least one of the first and second chemicals in a fixed time may be indicative of a time of dispensing of the fluid ink to the writing surface. Further, the solid product may decompose at a known rate, and an extent of decomposition of the solid product may be indicative of a time of dispensing of the fluid ink to the writing surface.

In another preferred aspect, the fluid ink may further comprise a heat-activated indicator and/or a chemical identifier.

In another preferred aspect, the fluid ink may further comprise at least a third chemical chemically reactive with the dye such that chemical reaction results in change of color, and the writing pen and fluid ink may be configured so that: at least the dye and the third chemical are substantially chemically isolated from each other prior to dispensing the ink to the writing surface; and at least the dye and the first chemical are substantially mixed with each other upon dispensing the fluid ink to the writing surface so as to chemically react with each other, and a color of the fluid ink may be indicative of an extent of chemical reaction by the dye, and an extent of chemical reaction by the dye may be indicative of a time of dispensing of the fluid ink to the writing surface. Further, the fluid ink may further comprise a fourth chemical chemically reactive with the third chemical, and a pH of a combination of the first and second chemicals may change upon reaction between the first and second chemicals, and a color of the dye may be pH sensitive. Further, the fluid ink may be contained in exactly one reservoir, and at least one of the dye and the third chemical may be encapsulated in microcapsules.

In another preferred aspect, the fluid ink may further comprise third and fourth chemicals chemically reactive with each other, and the writing pen and fluid ink may be configured so that: at least the third and fourth chemicals are substantially chemically isolated from each other prior to dispensing the ink to the writing surface; and at least the third and fourth chemicals are substantially mixed with each other upon dispensing the fluid ink to the writing surface so as to chemically react with each other, and an extent of chemical reaction between the third and fourth chemicals may be indicative of a time of dispensing of the fluid ink to the writing surface.

In one embodiment, a writing system for producing a writing having time-dependent characteristics comprises: a pen comprising: a reservoir containing a fluid; and a writing tip configured to dispense the fluid to a writing surface, wherein the fluid comprises a first chemical; and a writing surface comprising a second chemical chemically reactive with the first chemical, wherein the chemical reaction between the first and second chemicals has a known time dependence, and wherein an extent of chemical reaction between the first chemical and the second chemical is indicative of a time of dispensing of the fluid to the writing surface.

In one aspect, at least one of the fluid and the writing surface comprises a heat-activated indicator.

In one aspect, the fluid comprises a third chemical and the writing surface comprises a fourth chemical that is chemically reactive with the third chemical such that their chemical reaction causes them to solidify into a solid product. In another aspect, the third and fourth chemicals solidify into a solid product at a rate such that a viscosity of a mixture of the third and fourth chemicals at 25 degrees Celsius is greater than 10,000 centipoise at any time after seven days after a time of mixing of the third and fourth chemicals, and wherein the viscosity is less than 10,000 centipoise at any time before one day after the time of mixing of the third and fourth chemicals.

In one aspect, the fluid further comprises a first dye, the writing surface further comprises a second dye, and a color of the fluid as applied to the writing surface is indicative of a relative concentration of the first chemical in a mixture of the first and second chemicals.

In one aspect, at least one of the fluid and the writing surface further comprises a first chemical identifier, the first chemical identifier comprising at least a first rare-earth element.

In another embodiment, the invention includes a method of dating a writing, comprising: providing a writing created by the writing system or the pen as described; measuring an extent of chemical reaction between the first and second chemicals; and determining an approximate time of creation of the writing based at least in part on the measuring.

In another embodiment, the invention includes a method of creating a time-stamped writing, comprising: providing the writing system or the pen as described; and creating a writing on the writing surface using the pen, wherein an approximate time of the creating is ascertainable by determining an extent of chemical reaction between the first and second chemicals.

In another aspect, the described pen need not include the mixing region, and the writing tip need not dispense a substantially homogeneously mixed fluid.

DETAILED DESCRIPTION OF PREFERRED EMBODIMENTS

The disclosures of U.S. Pat. Nos. 3,389,125, 3,481,675, 3,634,276, 3,887,287, 4,061,620, 4,425,178, 4,531,141, 4,833,226, 5,180,652, 5,248,555, 5,306,092, 5,368,405, 5,368,905, 5,589,523, 5,600,443, 5,718,513, 5,759,246, 6,030,118, 6,506,494, 6,579,829, and 6,602,594 are hereby incorporated by reference to the degree necessary to understand the present invention and to enable one skilled in the art to make and use the present invention.

Figure 1:
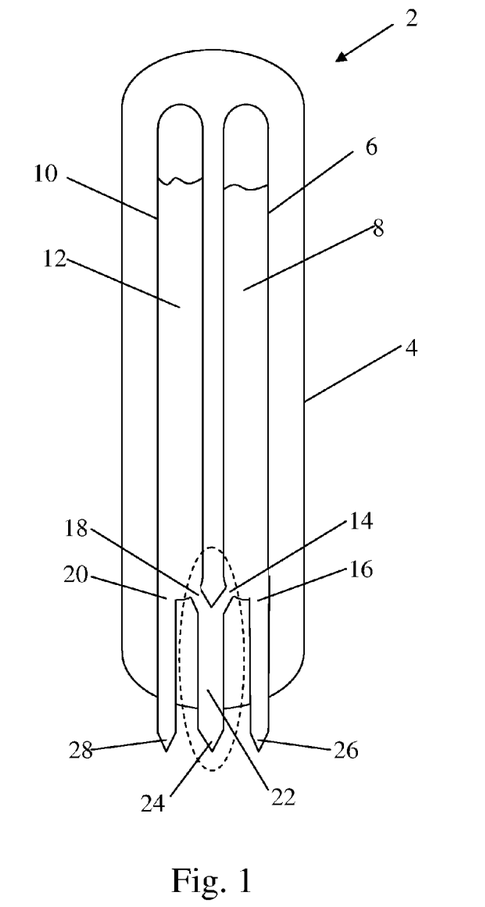
FIG. 1 shows a side cross-sectional view of an ink pen according to a preferred embodiment.

Referring now to FIG. 1, a pen 2 includes a housing 4, first and second reservoirs 6, 10 containing first and second fluids 8, 12. The first reservoir 6 has openings 14, 16 configured to dispense the first fluid, and the second reservoir 10 has openings 18, configured to dispense the second fluid. The opening 16 of the first reservoir 6 is fluidly connected to a writing tip 26. For example, writing tip 26 may comprise a porous material, such as felt, which absorbs the first fluid 8 from the opening 16 by capillary action and dispenses the first fluid 8 to a writing surface substantially unmixed with the second fluid 12. Similarly, the opening 20 of the second reservoir 10 is fluidly connected to a writing tip 28. Writing tip 28 may comprise a porous material, such as felt, which absorbs the second fluid 12 from the opening 20 by capillary action and dispenses the second fluid 12 to the writing surface substantially unmixed with the first fluid 8. The pen 2 also includes a mixing region 22 connected to a writing tip 24. The mixing region is connected to the first reservoir 6 via opening 14, and to the second reservoir 10 via opening 18. The mixing region may comprise a porous material, such as felt, which absorbs the first fluid 8 from the opening 14 and the second fluid 12 from the opening 18, substantially homogeneously mixes the fluids 8, 12, and dispenses the substantially homogeneously mixed fluid to the writing tip 24, which may then dispense the substantially homogeneously mixed fluid to the writing surface. The pen is preferably a writing pen, not longer than approximately ten inches, and preferably not longer than approximately six or seven inches.

The utility of the pen 2 is not limited to dispensing ink having time-dependent characteristics. For example, the first fluid 8 may comprise a yellow ink or dye and the second fluid 12 may comprise a red ink or dye. The substantially homogeneous mixture of the yellow and red ink, as mixed and subsequently dispensed by the mixing region 22 to the writing tip 24, is an orange ink, as understood by one skilled in the art. Thus, the present invention allows for three writing tips 24, 26, 28, each dispensing a different colored ink, with the need to provide only two different colored inks 8, 12 and corresponding reservoirs 6, 10. Of course, a pen having three such reservoirs with different colored inks could be capable of providing up to seven differently colored inks via seven different writing tips. Such a variation is included in the scope of the present invention. Many other possible uses of pen 2 and compositions of fluids 8, 12 will be apparent to one skilled in the art.

Figure 2A:
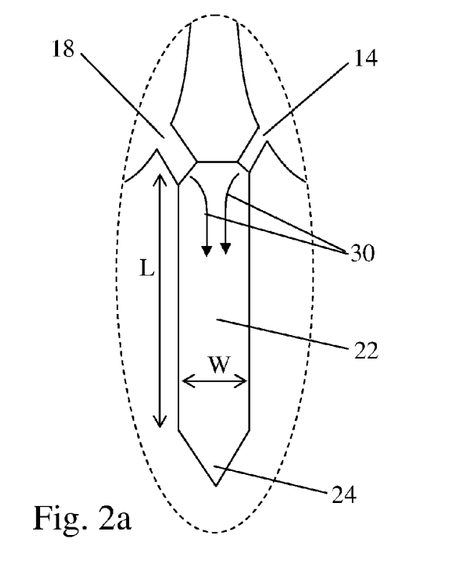
FIG. 2a shows an enlargement of the region indicated in FIG. 1.

Referring now to FIG. 2a, a close-up of the mixing region 22 of FIG. 1 is shown. The mixing region 22 is configured to draw in fluids 8, 12 from both reservoirs 6, 10 via respective openings 14, 18 and direct the flow of the fluids 8, 12 toward the writing tip 24, while in the meantime substantially homogeneously mixing the fluids 8, 12, such that the fluid dispensable from the writing tip 24 is substantially homogeneously mixed. One means by which to ensure substantially homogeneously mixing of the fluids 8, 12 is to provide a mixing region 22 that is thin and long, so that the fluids 8, 12 have sufficient time to mix via natural processes, such as diffusion. For example, as shown in FIG. 2a, arrows 30 show an approximate flow path of the fluids 8, 12 as they enter and flow through the mixing region 22. L is the length of the mixing region 22 substantially parallel to an average flow direction (i.e., the average of the approximate flow paths 30 of the fluids 8, 12) of the fluids 8, 12 through the mixing region 22, and W is the width of the mixing region 22 substantially perpendicular to the average flow direction of the fluids 8, 12 through the mixing region 22. By making L substantially greater than W, such as at least twice or thrice or five times W, the fluids 8, 12 are in close enough contact for a long enough time to substantially homogeneously mix. Further, the mixing region 22 may include a conical portion, such as in the writing tip 24, such that the fluids 8, 12 must pass through a very thin portion (i.e., W is very small) before being dispensed to the writing surface, to ensure proper mixing.

Figure 2B:
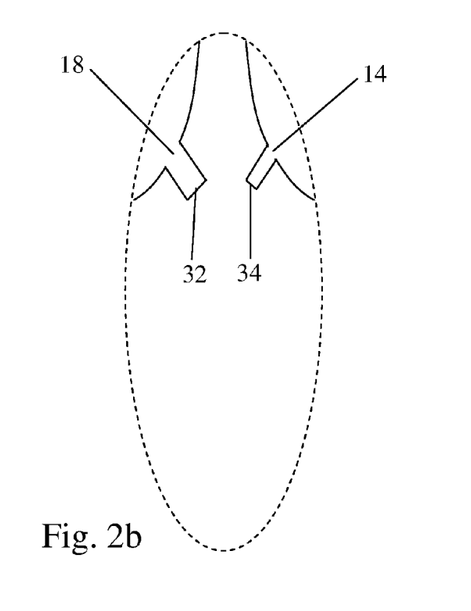
FIG. 2b shows an enlargement of the region indicated in FIG. 1, with the mixing region 22 and first writing tip 24 removed.

FIG. 2b is similar to FIG. 2a, except that the mixing region 22 and writing tip 24 have been removed. As will be discussed later, fluids 8, 12 may contain chemicals that solidify upon chemically reacting with each other. Thus, the substantially homogeneously mixed fluid inside the mixing region 22 and writing tip 24 may, after time, become solid or hardened, thus preventing further use of the mixing region 22 and writing tip 24. Thus, in a preferred embodiment, the mixing region 22 and writing tip 24 are removable and readily replaceable with another mixing region 22/writing tip 24. As shown in FIG. 2b, fluids 8, 12 enter mixing region 22 via through-holes 34, 32, respectively. Through-holes 32, 34 may comprise valves or porous materials, such that fluids 8, 12 do not flow through through-holes 34, 32 unless and until a mixing region 22/writing tip 24 is connected to them. The through-holes 34, 32 may also serve as physical stops, so that a mixing region 22/writing tip 24 may be inserted into the pen 2 (in an upward direction) until physically hitting through-holes 34, 32, after which the mixing region 22/writing tip 24 cannot move up further, and after which a fluid connection is established between the first and second reservoirs 6, 10 via openings 14, 18, respectively, and through-holes 34, 32, respectively. As shown in FIGS. 2a and 2b, opening 18 may be substantially greater than opening 14 (or vice versa), so that more of the second fluid 12 than the first fluid 8 flows into the mixing region 22, so that the substantially homogeneously mixed fluid dispensable from the writing tip 24 comprises substantially more of the second fluid 12 than the first fluid 8 (or vice versa). Alternatively, the first fluid 8 may be substantially more viscous than the second fluid 12, so that, even where openings 14, 18 are approximately the same in size, more of the second fluid 12 than the first fluid 8 flows into the mixing region 22.

Of course, mixing region 22 need not comprise a porous material. This is an example only. There are other ways, known in the art, to substantially homogeneously mix two fluids, preferably passively. Such embodiments are included in the scope of the present invention.

In a preferred embodiment of the present invention, the first fluid 8 comprises a first chemical and the second fluid 12 comprises a second chemical chemically reactive with the first chemical. Either of the first and second fluids 8, 12 may also comprise a dye, so that the resulting substantially homogeneously mixed fluid dispensable from the writing tip 24 serves as an ink providing a substantial contrast with the writing surface, as understood by one skilled in the art. The first and second chemicals may solidify into a solid product upon chemically reacting. For example, the first chemical could be a resin (i.e., adhesive resin) and the second chemical could be a hardener or curing agent. Typically, an adhesive resin is one which, when admixed with a hardener or curing agent, will react at room temperature to form an insoluble, thermoset product. Resins, hardeners, and epoxies, as well as their specific chemical compositions, are well known in the art, and will not be described in further detail here. They are described, for example, in U.S. Pat. Nos. 3,389,125, 4,061,620, and 4,425,178. Heat-curable mixtures are known in the art, such as in U.S. Pat. No. 3,634,276. Heat-curable epoxies and epoxies having very long pot lives (e.g., 6 months) are known in the art, such as in U.S. Pat. No. 4,833,226.

The chemical reaction between the first and second chemicals may also have a known time dependence, such that an extent of chemical reaction between the two chemicals may indicate a time that the first and second fluids were substantially homogeneously mixed in the mixing region 22. For example, the chemical reaction between the resin and hardener, such as by polymeric crosslinking, in many cases takes a long time to "fully" complete; i.e., the crosslinking continues to occur long after the initial mixing. Because the resin may be soluble in a common solvent, such as acetone or alcohol, and because the cured epoxy is typically substantially insoluble in such a solvent, an extent of reaction between the resin and hardener may be determined under laboratory conditions by placing the cured epoxy in the solvent for a fixed period of time and determining a level of dissolution of the resin, as will be understood by one skilled in the art. Based on the level or extent of dissolution, an approximate time of the initial mixing of the first and second fluids 8, 12 may be determined. Further, the resulting cured epoxy may naturally decompose with exposure to heat and/or radiation, as known to those skilled in the art. If the rate of decomposition is approximately known, then an extent of decomposition of the cured epoxy may indicate an approximate time of the initial mixing of the first and second fluids 8, 12.

Preferably, the first and second chemicals, such as a resin and hardener, respectively, solidify into a solid product, such as a cured epoxy, at a rate such that a viscosity of the substantially homogeneously mixed fluid at 25 degrees Celsius is greater than 10,000 centipoise (preferably greater than 20,000 or 50,000 centipoise) at any time after seven days after a time of mixing of the first and second fluids 8, 12, and the viscosity is less than 10,000 centipoise at any time before one day after the time of mixing of the first and second fluids 8, 12. If the viscosity of an ink is much greater than 10,000 centipoise, it is very difficult to use the ink as a ball-point ink or an ink for a felt-tip pen. Thus, by insuring that the first and second fluids 8, 12 react upon mixing such that they cannot be dispensed as a fluid ink after a certain period of time after mixing, then it is very difficult for a defrauder to use the pen of the present invention to fake a document or writing. For example, if he knows that he intends to fraudulently write a document at some point in the future, he may mix first and second fluids 8, 12 now. However, in the present invention, because first and second fluids 8, 12 react to solidify into a solid product, the defrauder will not be able to dispense the resulting substantially homogeneously mixed fluid more than a week after mixing. Thus, with the proper choice of first and second chemicals in first and second fluids 8, 12, respectively (such as resin and hardener, respectively), the pen 2 will provide a certain "window" of opportunity, at the beginning of which the fluids 8, 12 are mixed, and at the end of which the resulting substantially homogeneously mixed fluid is too hard or solid or viscous to be dispensed to a writing surface as a fluid. This window may be a few minutes, a few hours, a day, a few days, or a week or more. However, while the approximate time at which the first and second fluids 8, 12 were mixed may be determined according to the pen, ink, and method of the present invention, it may be difficult or impossible to determine exactly when in the window the substantially homogeneously mixed fluid/ink was dispensed or deposited to the writing surface. This is because the substantially homogeneously mixed fluid could have been deposited anytime during the window.

For example, assume that the first fluid 8 comprises a resin and the second fluid 12 comprises a hardener and black dye, chosen such that the resin and hardener harden within 24 hours upon mixing to a point at which the mixture can no longer be dispensed to a writing surface as a fluid, and chosen such that the chemical reaction continues to occur between the resin and hardener for at least a year so that an extent of reaction between the resin and hardener can be reliably determined in a laboratory within the course of a year. In this example, the user of the pen 2 may insert a new mixing region 22/writing tip 24 into the pen 2, as shown in FIGS. 2a and 2b, thus abutting against through-holes 34, 32, so as to invoke flow of fluids 8, 12 into the mixing region 22. Once the first and second fluids 8, 12 mix in the mixing region 22, they begin to react and to solidify. The fluids 8, 12 continue to absorb and travel downward through the mixing region 22 toward the writing tip 24, where they may be dispensed as a substantially homogeneously mixed fluid to a writing surface. Once they have begun to mix in the mixing region 22, the user may then have around 24 hours in which to write using pen 2. After those 24 hours, if he has not used the pen 2, the substantially homogeneously mixed fluid in the mixing region 22 and/or writing tip 24 will harden beyond the ability of the pen 2 to deliver the substantially homogeneously mixture as a fluid. Then, in order to continue using the pen 2, the user should remove the used/hardened mixing region 22/writing tip 24 and replace it with a new mixing region 22/writing tip 24, where the process begins again.

After the user has used the pen 2 to write on the writing surface, the resin and hardener continue to react over the course of the next year or more. Assume, now, that it is one year later, and the user must prove that he made the writing the previous year. He sends the writing to a laboratory for analysis, where the cured epoxy/ink is dissolved in a solvent. Depending on a rate or extent of dissolution of the ink (such as a relative rate of dissolution, compared with an entire mass of cured ink on the writing surface, which can be determined in ways well known to those skilled in the art), and by knowing a relationship between the absolute or relative rate of dissolution of the ink and a time of mixing of the resin and hardener, an approximate time/date of mixing of the first and second fluids 8, 12 can be determined. However, because the writing could have been made by the user any time within the 24-hour window, the user will not be able to prove when, during that 24-hour period after the first and second fluids 8, 12 were mixed, that he made the writing. Nevertheless, a very good approximation of the time of writing can be determined, and the invention is relatively impervious to fraud by pre-mixing. Epoxy resins having fast and slow rates of curing are well known in the art. Further, how to choose the proper resin and hardener to achieve the required rate of solidifying/curing, and the exact compounds and proportions thereof, is either well known in the art and/or can be determined with minimal experimentation, and will not be discussed further. Further, other methods of determining an extent of reaction between the first and second chemicals (in this example, the resin and hardener) will be known to those skilled in the art. Another example is by measuring the color of the ink (e.g., doing a spectral analysis of reflectance versus frequency), where the color of the substantially homogeneously mixed fluid changes in a known, predictable way with time.

It is important in this embodiment that the first and second chemicals (resin and hardener) are mixed at the proper ratio. A different mixing ratio, as known by those skilled in the art, may result in a different curing rate. The curing rate is important for at least two reasons: a) first, the previously discussed window of time in which the substantially homogeneously mixed fluid may be deposited as ink must be controlled (e.g., if it is too long, then the date-of-mixing analysis results will be too fuzzy; if it is too short, then the user must replace the mixing region 22/writing tip 24 too often); b) second, if the reaction between the first and second chemicals, themselves, are used to date the substantially homogeneously mixed fluid, their rate of reaction will affect the dating analysis. Thus, in the above embodiment, in which the second fluid contains hardener and a black due, the first fluid may contain a resin and a blue (or otherwise differently colored) dye. Then, a resulting color (e.g., reflectance spectrum) of the substantially homogeneously mixed fluid may indicate relative concentrations of the first and second fluids in the substantially homogeneously mixed fluid. Based on this information, the lab analysts who are charged with approximating the date that the first and second fluids were mixed and deposited as the substantially homogeneously mixed fluid may adjust their analysis according to a knowledge of the reaction rate between the first and second chemicals at these concentrations.

Alternatively or in addition, the first fluid may contain a third chemical and the second fluid may contain a fourth chemical chemically reactive with the third chemical, such that the reaction between the third and fourth chemicals has a known time dependence, and such that an extent of chemical reaction between the third and fourth chemicals is indicative of a time of mixing of the first and second fluids. Further, at least one of the third and fourth chemicals may have a color that is measurable by measuring a color of the deposited substantially homogeneously mixed fluid, such that the color changes during chemical reaction between the third and fourth chemicals, and such that a color of the substantially homogeneously mixed fluid is indicative of a time of mixing of the first and second fluids. Preferably, at least one of the third and fourth chemicals is entirely or substantially nonreactive with air. Chemicals that react together in known, predictable ways are well known in the art, including chemicals whose reaction results in a change of color, and will not be discussed further here, although some examples follow. For example, the third chemical could contain at least one oxygen supplying material which may be a metal oxide, an inorganic metal or ammonium salt, or an oxygen-containing organic salt, and the fourth chemical could contain at least one metal or metalloid, such that the resulting mixture is capable of chemically reacting to yield heat and reaction by-products. For example, the third chemical could comprise an oxidizer (having a color), such as one of the metal oxides (e.g., iron oxide), nitrates (e.g., potassium nitrate), chlorates, perchlorates, etc., and the fourth chemical could comprise a reducer, such as a metal (e.g., aluminum or iron). While the reducer may oxidize by reaction with oxygen atoms in the atmosphere (and may thus be susceptible to the problems with the prior art discussed previously), the colored oxidizer (such as rust-colored iron oxide) will not. Thus, by measuring an extent of reaction of the oxidizer (e.g., by measuring the color of the ink), the measurement could then be compared with a known reaction rate of the oxidizer with the reducer to determine an approximate time at which the first and second fluids were dispensed as the substantially homogeneously mixed fluid. In order to prevent a slowdown of reaction by the oxidizer due to the reducer reacting with air, the substantially homogeneously mixed fluid may contain a greater concentration of reducer than is stochastically needed to react with the fluid's concentration of oxidizer. In another embodiment, the third or fourth chemical (e.g., the oxidizer or reducer) could be in a particular structural form in the first or second fluids, such as in prill (or substantially spherical) form. The rate of reaction between the third and fourth chemicals would then depend on an average size and shape of the form, so that a rate of dissolution of the third or fourth chemical (during dating analysis) will depend on time and the average size and shape of the form of the third or fourth chemical in the substantially homogeneously mixed fluid. Other means for regulating and subsequently measuring the extent of reaction between the third and fourth chemicals will be apparent to one skilled in the art, and are included in the scope of the present invention. For example, the third or fourth chemical may have a particular crystalline structure that may change upon reaction with the other of the third or fourth chemical, and this change may be measurable during the dating analysis. Also, the third and fourth chemicals, when mixed, may result in a solution such that the $\alpha$ and $\beta$ phases of the mixture changes with time, as understood by one skilled in the art.

Measuring the color of the substantially homogeneously mixed fluid may include shining light with a wide range of frequencies (such as from infrared to ultraviolet) and measuring the reflectance of the ink as a function of frequency. The frequencies that the ink will absorb (and the extent of the absorption) may change in a known, predictable way over time, due to reaction between the third and fourth chemicals (or between the first and second chemicals, as discussed with regard to the previous embodiment).

In the above embodiments, where the time-indicating reaction occurs between the third and fourth chemicals, the first and second chemicals (e.g., resin and hardener) still serve the purpose of preventing a defrauder from mixing the first and second fluids prematurely (i.e., long before the actual writing will take place) and causing the time-dependent chemical reaction between the third and fourth chemicals to begin prematurely, because the defrauder will only be able to use the resulting substantially homogeneously mixed fluid during the previously discussed window of opportunity (which may last only a few hours, up to a week or so).

In another embodiment, the third chemical may be the resin (e.g., the third chemical could be the first chemical), and the fourth chemical may be a chemical that is chemically reactive with the resin, such as an oxidizer. Similarly to the embodiment discussed above, the resin and oxidizer may react in a known, predictable way such that the extent of their reaction is indicative of a time that the first and second fluids were substantially homogeneously mixed. A benefit to this embodiment is that a third distinct chemical need not be added; the resin, hardener, and fourth chemical (where the first fluid contains the resin and the second fluid contains the hardener and fourth chemical) are sufficient. In another embodiment, because the writing surface to which the substantially homogeneously mixed fluid is dispensed is typically paper or a similar organic substance, the substantially homogeneously mixed fluid may contain only a third chemical that is chemically reactive with the paper or writing surface. For example, the third chemical could be an oxidizer or an acid, either of which will react with the paper over time. For example, the third chemical could comprise a very low concentration of nitric acid, which will slowly attack the paper. An extent of reaction between the acid and paper could indicate a time of mixing of the first and second fluids.

In many of the above embodiments, the chemical reaction between two or more chemicals that indicates a time of mixing of the first and second fluids may be artificially accelerated with heating, thus making the substantially homogeneously mixed fluid appear like it was dispensed to the writing surface at a time before it actually was. This problem may be assuaged by adding to at least one of the first and second fluids a heat activated indicator. Heat activated indicators are well known in the art; examples are discussed in U.S. Pat. Nos. 4,531,141, 5,180,652, 5,248,555, 5,368,905, 5,718,513, 6,030,118, 6,579,829, and 6,602,594. Heat activated indicators may comprise a single (possibly heterogeneous) substance, such as microcapsules that contain a heat-fusible substance and a powdery dyestuff such that the color of the heat activated indicator changes when the temperature increases, or may comprise two or more separate substances such that, when mixed, become susceptible to color (or other) change upon application of heat or a temperature change or increase. Heat activated indicators that change variably with variable increases in temperature are known, as well as heat activated indicators whose change is permanent. Thus, either the first or second fluid may contain the heat activated indicator, or else the first fluid may contain one component and the second fluid may contain another component of the heat activated indicator. A benefit to the second aspect is that the first and second fluids, prior to being substantially homogeneously mixed by the pen according to the present invention, may be stored in a relatively hot place without affecting the ability of the pen to dispense a substantially homogeneously mixed fluid whose time of mixing can be determined.

However, after the substantially homogeneously mixed fluid has been mixed (or after the heat activated indicator becomes susceptible to a temperature increase, such as above a certain threshold), the color (or some other measurable characteristic) of the substantially homogeneously mixed fluid will change if the substantially homogeneously mixed fluid is heated too much. This change in color (or characteristic) will indicate to the laboratory analysts who have been charged with determining the date that the substantially homogeneously mixed fluid was dispensed to the writing surface that the ink/fluid has been heated, and therefore that the results may not be accurate, because heating of the ink/fluid may artificially accelerate reaction in the ink, indicating an incorrect date of mixing of the first and second fluids. However, if the heat activated indicator has not been activated, then the analysts can be relatively certain that the ink/fluid has not been excessively heated (such as to above a threshold temperature), and therefore the resulting analysis (of determining the date of mixing of the first and second fluids) is accurate.

For example, assume that the first fluid contains a heat activated indicator that changes color (i.e., at least one aspect of its reflectance spectrum changes in a clearly measurable way) at a temperature above 100° F., which is substantially above a room temperature at which documents are normally kept or stored. A user uses the pen according to the present invention (such that the first fluid also contains, e.g., a resin and a third chemical, and the second fluid contains, e.g., a hardener and a fourth chemical chemically reactive with the third chemical, as previously discussed) to make a writing. She stores the writing in a file cabinet in her home, where the temperature does not exceed 100° F., but on average is 76° F. A year later, she is charged in a litigation with proving that she wrote the document at least 6 months earlier (which happens to be 6 months after she actually wrote it), so she sends the writing to a lab for analysis. At the lab, measurements (such as dissolution or optical measurements) are taken on the ink/fluid, and the extent of chemical reaction between the third and fourth chemicals is determined. Because the heat activated indicator has not been activated, the lab analysts determine that the ink/fluid has not been subjected to temperatures higher than 100° F. Because no other information is available, the analysts assume that the ink/fluid remained at 100° F. since the mixing of the first and second fluids. Based on a knowledge of a rate of reaction between the third and fourth chemicals at 100° F., the analysts conservatively estimate, for example, that the first and second fluids must have been mixed at some time before 10 months prior to analysis. (Of course, if the analysts could assume the truth, which in this case is that the average temperature of the ink/fluid was 76° F., then their analysis would show that the first and second fluids were mixed a year before analysis.) Thus, the user will be able to prove what she is charged with proving.

On the other hand, if the user was a defrauder, who actually wrote the writing yesterday, and who is charged with proving that she wrote the writing more than six months ago in order to win a litigation, she will not be able to do so. If she does not heat the ink/fluid, the analysis will show that the first and second fluids were mixed yesterday. If she does heat the ink/fluid so as to accelerate the reaction between the third and fourth chemicals, the heat activated indicator will indicate a temperature greater than 100° F., and the analysts will report so (and will not be able to give a reliable estimate of the date of mixing the first and second fluids). Thus, the present invention prevents defrauders from counterfeiting the date of a writing.

The fact that the color of many of the chemicals in the first and second fluids must be subsequently or simultaneously measured to gain certain information (such as an extent of reaction between the third and fourth chemicals, such as a relative concentration of the first fluid in the substantially homogeneously mixed fluid, such as an activation of the heat activated indicator, etc.) is not a problem, because each piece of information may be gleaned by looking at a different portion of a full spectral reflectance analysis of the ink/fluid. For example, the third and fourth chemicals, when reacting, may result in a substantial change in the reddish region of the reflectance spectrum, while the heat activated indicator, if activated, may result in a change in the UV region of the reflectance spectrum, so that both pieces of information can be gained from a single spectrum reflectance analysis.

At least one of the first and second fluids may also comprise a chemical identifier, so as to be able to identify or determine some feature of the fluids. For example, the chemical identifier may be used to indicate a manufacturer of the fluids, so that the lab analysts can be more certain that the fluids were not counterfeited by a defrauder. For example, the chemical identifier may comprise a rare-earth element, as known by those skilled in the art, such as Europium (Eu) or Gadolinium (Gd). A presence of the chemical indicator may indicate that the substantially homogeneously mixed fluid is authentic, because the first and second fluids were manufactured by a reputable manufacturer. Further, the substantially homogeneously mixed fluid may comprise a second chemical identifier, such as a second rare-earth element, such that a relative concentration of the first rare-earth element to the second-rare earth element is a "key" that better and more authoritatively authenticates the substantially homogeneously mixed fluid. The first and second chemical identifiers (such as rare-earth elements) should be chosen so that their concentrations can be measured accurately and repeatably. For example, it is known in the art that both Eu and Gd are very sensitive to neutron activation analysis, in which stable forms of Eu and Gd are nuclearly activated by placing them in a neutron field (such as from a nuclear reactor); the resulting activated unstable isotopes of Eu and Gd can be measured using a quality gamma ray detector and the relative concentrations of Eu and Gd in the original sample determined. In addition or alternatively to a chemical identifier used to identify and authenticate a manufacturer of the first and second fluids, the chemical identifier may be used to identify a "model" or "type" of first and second fluids. For example, one combination of first and second fluids may comprise chemicals chosen such that the resulting substantially homogeneously mixed fluid is most accurately datable in a range from one day to one year, and another combination of first and second fluids may comprise chemicals chosen such that the resulting substantially homogeneously mixed fluid is datable up to five years. Different chemical identifiers may be placed in each of these different combinations so that the lab analyst charged with dating the ink/fluid on the writing surface know which "chart" or equations to use in dating the ink/fluid. As another example, one combination of first and second fluids may comprise chemicals chosen such that the resulting substantially homogeneously mixed fluid is substantially blue, and another combination of first and second fluids may comprise chemicals chosen such that the resulting substantially homogeneously mixed fluid is substantially red (because people like using different colored inks). Different chemical identifiers may be placed in each of these different combinations so that the lab analysts charged with dating the ink/fluid on the writing surface know which reflectance spectra or equations to use in dating the ink/fluid.

Figure 3:
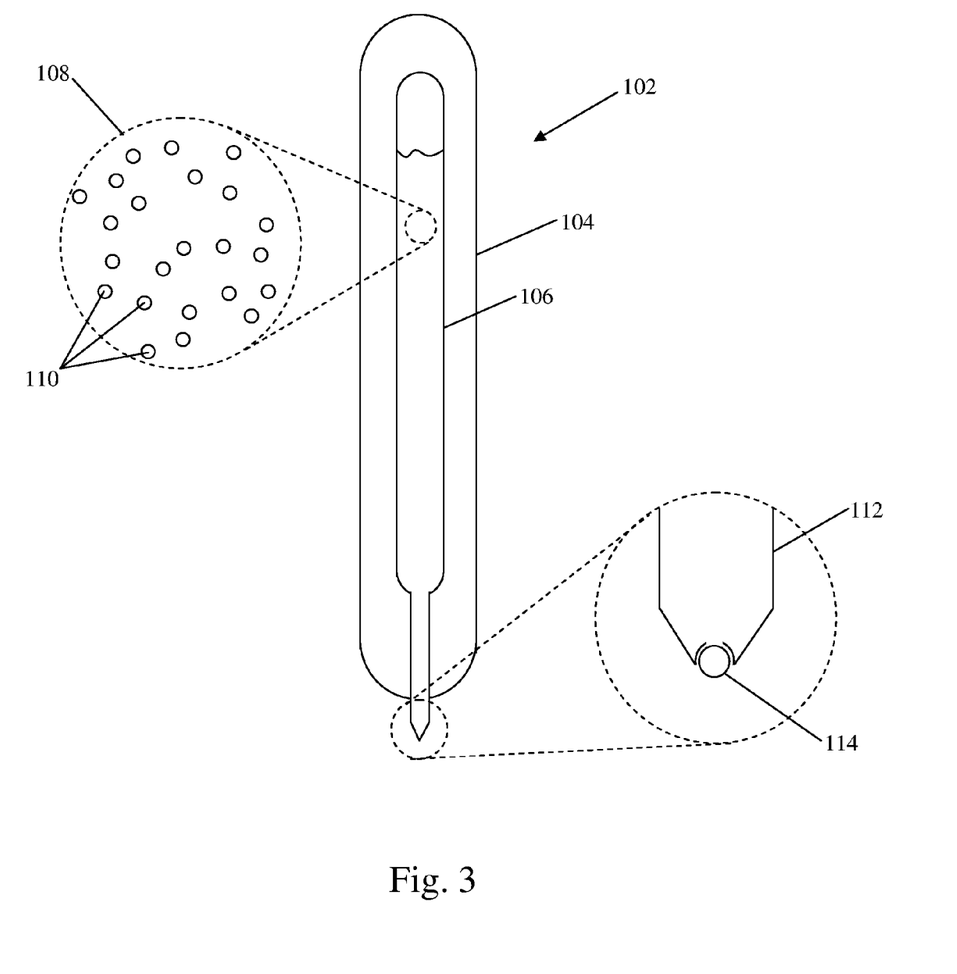
FIG. 3 shows a side cross-sectional view of an ink pen according to another preferred embodiment.

There are, of course, many other ways of mixing the first and second fluids, and the present invention is not limited to the embodiment shown in FIGS. 1, 2a, and 2b. Another example will be shown with reference to FIG. 3. In FIG. 3, a pen 102 according to another preferred embodiment of the present invention comprises a housing 104, a reservoir 106 inside the housing 104 and configured to contain a fluid, a fluid ink 108 contained in the reservoir 106, a writing tip 112, and a ball point 114 connected to the writing tip 112.

The fluid ink 108 comprises at least a first chemical, and a second chemical (chemically reactive with the first chemical) encapsulated in microcapsules 110. Microcapsules are well known in the art; examples are described in U.S. Pat. Nos. 5,589,523 and 6,506,494. The microcapsules 110 are preferably very small, such as less than 20 μm, preferably less than 10 μm, and most preferably less than 1 μm. They have a wall made of a substance that is not substantially chemically reactive with either of the first or second chemicals. The wall may be broken (and the second chemical released into the first chemical) by a physical force applied to the microcapsules 110, by heat, or by any other appropriate method. In a preferred embodiment, the pen 102 is a ball-point pen having ball point 114 that is configured to dispense the fluid ink 108 to a writing surface by rolling with respect to the writing surface. The ball point 114 comprises a hard metal, such as stainless steel, to which pressure is applied during the writing process. This pressure squeezes and ultimately breaks or crushes the microcapsules 110, such as between the ball point 114 and the writing surface. The second chemical released from the microcapsules 110 then substantially mixes with the first chemical and a reaction between the first and second chemicals begins. Thus, the pen 102 and fluid ink 108 are configured so that the first and second chemicals are substantially chemically isolated from each other (i.e., they won't chemically react) prior to dispensing the fluid ink 108 to the writing surface, and the first and second chemicals are substantially mixed with each other upon dispensing the fluid ink 108 to the writing surface so as to chemically react with each other.

The first and second chemicals may, of course, be the resin and hardener (or any two chemicals that solidify into a solid product upon chemically reacting), respectively or vice versa, as discussed with respect to the embodiment shown in FIG. 1. Further, the fluid ink 108 preferably contains at least one dye, so that the fluid ink 108 may be used as an ink having contrast with a writing surface. Further, the fluid ink 108 may contain a third chemical chemically reactive with the dye such that chemical reaction results in a change in color, such that a color of the fluid ink on the writing surface is indicative of an extent of reaction between the third chemical and dye (which is indicative of a time of dispensing of the fluid ink 108), and such that the third chemical (or dye, but not both) is encapsulated in microcapsules 110 so that the third chemical and dye are not mixed until being dispensed by the pen 102. Alternatively, the fluid inside the microcapsules 110 may be considered a second fluid, and the fluid outside the microcapsules 110 may be considered a first fluid (or vice versa), and the embodiments previously discussed with respect to the chemical compositions of first and second fluids may also apply to this embodiment. For example, the first fluid may contain a heat activated indicator, a resin, a third chemical, and a first dye, and the second fluid may contain a chemical identifier, a hardener, a fourth chemical, and a second dye.

There are, of course, other ways that the first and second fluids of fluid ink 108, separated in the reservoir 106 via the walls of microcapsules 110, may be mixed upon dispensing the fluid ink 108. Further, first and second fluids could be contained in separate reservoirs prior to using the pen, and then mixed when the pen is ready to used. For example, a first reservoir could be made of a breakable or openable or rupturable substance and could contain the first fluid, and the second reservoir could be made of a malleable substance and could contain the second fluid and the first reservoir. When the user is ready to use the pen, he can simply squeeze the second reservoir to break or rupture the first reservoir inside the second reservoir, causing the first fluid to flow into and substantially homogeneously mix with the second fluid. Then, the substantially homogeneously mixed fluid could be dispensed to a writing surface, as discussed previously. Because the first and second fluids will begin to solidify, the user has the window of opportunity in which to use the pen, after which the pen may be disposed of. Further, if the first fluid contains a first dye and the second fluid contains a second different dye, the extent of homogeneity of the mixed fluid can be determined by the lab analysts by doing a spectral reflectance analysis; if the mixed fluid is not substantially homogeneously mixed, then they may decide that the dating analysis is not valid.

Figure 4:
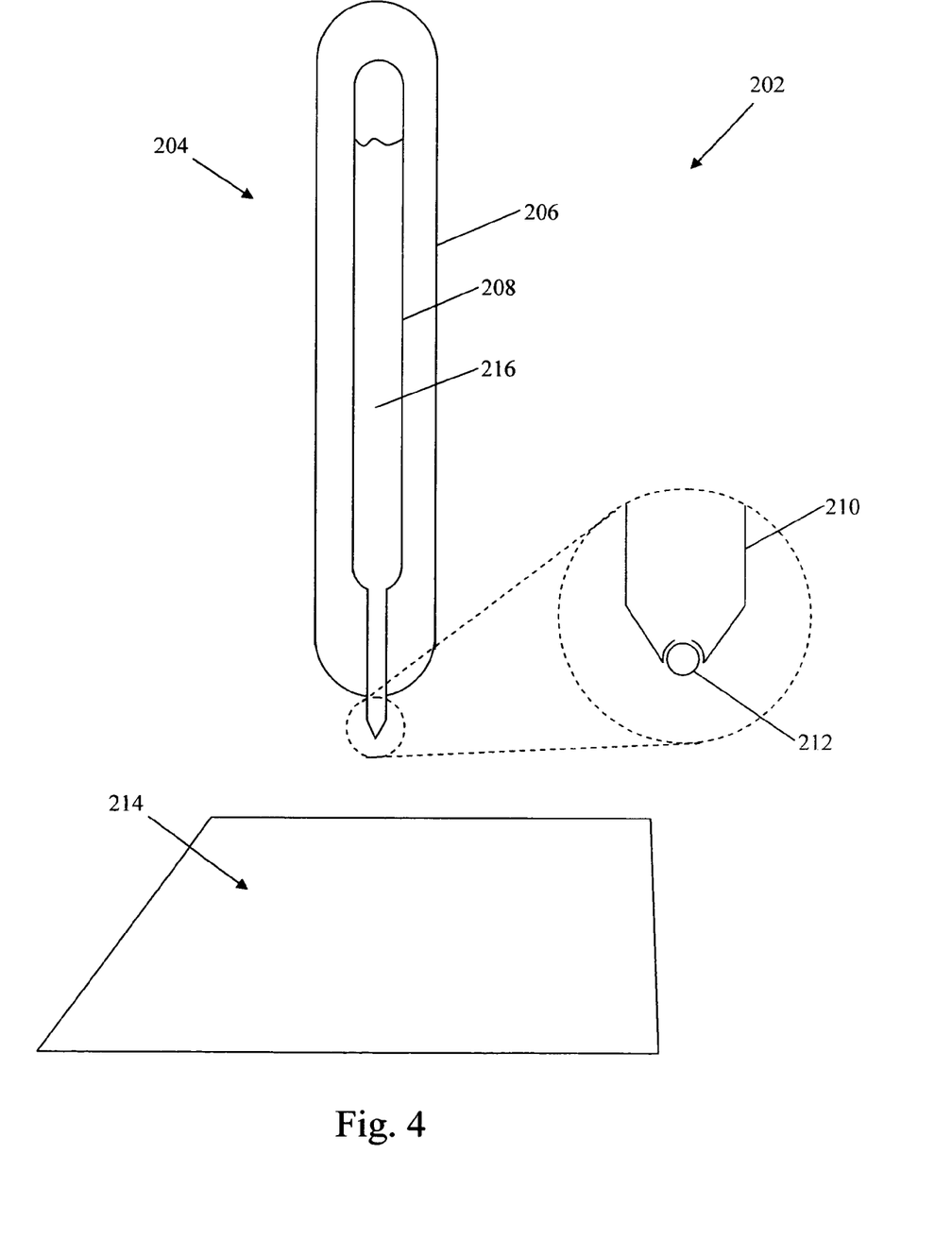
FIG. 4 shows a perspective view of writing system according to an embodiment of the present invention.

A writing system 202 for producing a writing having time-dependent characteristics includes a writing surface 214 and a pen 204, the pen 204 comprising a housing 206, a reservoir 208 containing a fluid 216, and a writing tip 210 (including a ball point 212) configured to dispense the fluid 216 to the writing surface 214. The fluid 216 may comprise a first chemical and the writing surface 214 may comprise a second chemical chemically reactive with the first chemical, where the chemical reaction between the first and second chemicals may have a known time dependence, and where an extent of chemical reaction between the first chemical and the second chemical may be indicative of a time of dispensing of the fluid 216 to the writing surface 214. At least one of the fluid 216 and the writing surface 214 may comprise a heat-activated indicator. The fluid 216 may comprise a third chemical and the writing surface 214 may comprise a fourth chemical that is chemically reactive with the third chemical such that their chemical reaction causes them to solidify into a solid product. The third and fourth chemicals may solidify into a solid product at a rate such that a viscosity of a mixture of the third and fourth chemicals at 25 degrees Celsius is greater than 10,000 centipoise at any time after seven days after a time of mixing of the third and fourth chemicals, and the viscosity may be less than 10,000 centipoise at any time before one day after the time of mixing of the third and fourth chemicals. The fluid 216 may further comprise a first dye, the writing surface 214 may further comprise a second dye, and a color of the fluid 216 as applied to the writing surface 214 may be indicative of a relative concentration of the first chemical in a mixture of the first and second chemicals. At least one of the fluid 216 and the writing surface 214 may further comprise a first chemical identifier, the first chemical identifier comprising at least a first rare-earth element.

The present invention includes a method of dating a writing, comprising providing a writing created by the writing system 202, measuring an extent of chemical reaction between the first and second chemicals, and determining an approximate time of creation of the writing based at least in part on the measuring. The present invention includes a method of creating a time-stamped writing, comprising providing the writing system 202, and creating a writing on the writing surface 214 using the pen 204, where an approximate time of the creating is ascertainable by determining an extent of chemical reaction between the first and second chemicals.

What is claimed is:

1. A writing system for producing a writing having time-dependent characteristics, comprising:
   a pen comprising: a reservoir containing a fluid; and a writing tip configured to dispense the fluid to a writing surface, wherein the fluid comprises a first chemical; and
   a writing surface comprising a second chemical chemically reactive with the first chemical,
   wherein the chemical reaction between the first and second chemicals has a known time dependence,
   wherein an extent of chemical reaction between the first chemical and the second chemical is indicative of a time of dispensing of the fluid to the writing surface, and
   wherein the fluid comprises a third chemical and the writing surface comprises a fourth chemical that is chemically reactive with the third chemical such that their chemical reaction causes them to solidify into a solid product.

2. The writing system as claimed in claim 1, wherein at least one of the fluid and the writing surface comprises a heat-activated indicator.

3. The writing system as claimed in claim 1, wherein the third and fourth chemicals solidify into a solid product at a rate such that a viscosity of a mixture of the third and fourth chemicals at 25 degrees Celsius is greater than 10,000 centipoise at any time after seven days after a time of mixing of the third and fourth chemicals, and wherein the viscosity is less than 10,000 centipoise at any time before one day after the time of mixing of the third and fourth chemicals.

4. The writing system as claimed in claim 1,
   wherein the fluid further comprises a first dye,
   wherein the writing surface further comprises a second dye, and
   wherein a color of the fluid as applied to the writing surface is indicative of a relative concentration of the first chemical in a mixture of the first and second chemicals.

5. The writing system as claimed in claim 1, wherein at least one of the fluid and the writing surface further comprises a first chemical identifier, the first chemical identifier comprising at least a first rare-earth element.

6. A method of dating a writing, comprising:
   providing a writing created by a writing system for producing a writing having time-dependent characteristics, the writing system comprising:
      a pen comprising: a reservoir containing a fluid; and a writing tip configured to dispense the fluid to a writing surface, wherein the fluid comprises a first chemical; and
      a writing surface comprising a second chemical chemically reactive with the first chemical,
      wherein the chemical reaction between the first and second chemicals has a known time dependence,
      wherein an extent of chemical reaction between the first chemical and the second chemical is indicative of a time of dispensing of the fluid to the writing surface;
   measuring an extent of chemical reaction between the first and second chemicals; and
   determining an approximate time of creation of the writing based at least in part on the measuring.

7. The method as claimed in claim 6, wherein at least one of the fluid and the writing surface comprises a heat-activated indicator.

8. The method as claimed in claim 6, wherein the fluid comprises a third chemical and the writing surface comprises a fourth chemical that is chemically reactive with the third chemical such that their chemical reaction causes them to solidify into a solid product.

9. The method as claimed in claim 8, wherein the third and fourth chemicals solidify into a solid product at a rate such that a viscosity of a mixture of the third and fourth chemicals at 25 degrees Celsius is greater than 10,000 centipoise at any time after seven days after a time of mixing of the third and fourth chemicals, and wherein the viscosity is less than 10,000 centipoise at any time before one day after the time of mixing of the third and fourth chemicals.

10. The method as claimed in claim 6,
    wherein the fluid further comprises a first dye,
    wherein the writing surface further comprises a second dye, and
    wherein a color of the fluid as applied to the writing surface is indicative of a relative concentration of the first chemical in a mixture of the first and second chemicals.

11. The method as claimed in claim 6, wherein at least one of the fluid and the writing surface further comprises a first chemical identifier, the first chemical identifier comprising at least a first rare-earth element.

12. A method of creating a time-stamped writing, comprising:
    providing a writing system for producing a writing having time-dependent characteristics, the writing system comprising:
       a pen comprising: a reservoir containing a fluid; and a writing tip configured to dispense the fluid to a writing surface, wherein the fluid comprises a first chemical; and
       a writing surface comprising a second chemical chemically reactive with the first chemical,
       wherein the chemical reaction between the first and second chemicals has a known time dependence,
       wherein an extent of chemical reaction between the first chemical and the second chemical is indicative of a time of dispensing of the fluid to the writing surface; and
    creating a writing on the writing surface using the pen,
    wherein an approximate time of the creating is ascertainable by determining an extent of chemical reaction between the first and second chemicals.

13. The method as claimed in claim 12, wherein at least one of the fluid and the writing surface comprises a heat-activated indicator.

14. The method as claimed in claim 12, wherein the fluid comprises a third chemical and the writing surface comprises a fourth chemical that is chemically reactive with the third chemical such that their chemical reaction causes them to solidify into a solid product.

15. The method as claimed in claim 14, wherein the third and fourth chemicals solidify into a solid product at a rate such that a viscosity of a mixture of the third and fourth chemicals at 25 degrees Celsius is greater than 10,000 centipoise at any time after seven days after a time of mixing of the third and fourth chemicals, and wherein the viscosity is less than 10,000 centipoise at any time before one day after the time of mixing of the third and fourth chemicals.

16. The method as claimed in claim 12, wherein the fluid further comprises a first dye, wherein the writing surface further comprises a second dye, and wherein a color of the fluid as applied to the writing surface is indicative of a relative concentration of the first chemical in a mixture of the first and second chemicals.

17. The method as claimed in claim 12, wherein at least one of the fluid and the writing surface further comprises a first chemical identifier, the first chemical identifier comprising at least a first rare-earth element.

* * * * *